(12) United States Patent

Meidan et al.

(10) Patent No.: US 12,586,029 B1

(45) Date of Patent: Mar. 24, 2026

(54) CUSTOMIZED RETAIL ENVIRONMENT SENSOR CALIBRATION

(71) Applicant: Amazon Technologies, Inc., Seattle, WA (US)

(72) Inventors: Ofer Meidan, Hadera (IL); Paul Ignatius Dizon Echevarria, Seattle, WA (US); Joohyun Park, Seattle, WA (US); Amnon Yacov, Gvat (IL); Ayelet Barak, Haifa (IL); Aviv Naftaly, Kibbutz Merhavia (IL); Ayal Fakher Aldin, Haifa (IL); Guy Raviv, Haifa (IL); Tohar Gilbar, Pardes Hana Karkor (IL); Luna Karayanni, Kfar yassif (IL); Claire Law, Seattle, WA (US); Matthew Fletcher Harrison, Seattle, WA (US); Youwang Deng, Kirkland, WA (US); Ta-Shan Yao, Mercer Island, WA (US); Amir Nahir, Megadim (IL); Petko Tsonev, Issaquah, WA (US); Sneha Ramchandran, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 225 days.

(21) Appl. No.: 18/082,507

(22) Filed: Dec. 15, 2022

(51) Int. Cl.

| | |
|---|---|
| *G06Q 10/087* | (2023.01) |
| *G01G 19/40* | (2006.01) |
| *G06T 7/70* | (2017.01) |
| *G06V 20/40* | (2022.01) |

(52) U.S. Cl.
CPC .......... *G06Q 10/087* (2013.01); *G01G 19/40* (2013.01); *G06T 7/70* (2017.01); *G06V 20/44* (2022.01)

(58) Field of Classification Search
CPC .............. G06F 3/0613; G06F 11/3476; G06Q 10/0633; G06Q 10/087; G06Q 40/00; G06Q 90/20
USPC .......... 705/14.64, 23, 28, 323; 235/375, 382
See application file for complete search history.

(56) References Cited

U.S. PATENT DOCUMENTS

| | | | |
|---|---|---|---|
| 9,117,106 B2 | 8/2015 | Dedeoglu et al. | |
| 9,235,928 B2 | 1/2016 | Medioni et al. | |
| 9,473,747 B2 | 10/2016 | Kobres et al. | |
| 10,614,414 B1* | 4/2020 | Raymond .......... | G06Q 10/0633 |
| 2007/0050271 A1* | 3/2007 | Ufford ................. | G06Q 10/087 |
| | | | 705/28 |
| 2013/0223673 A1* | 8/2013 | Davis ...................... | G06F 3/147 |
| | | | 235/375 |
| 2013/0284806 A1* | 10/2013 | Margalit .............. | G07G 1/0009 |
| | | | 235/382 |
| 2013/0290106 A1* | 10/2013 | Bradley ................. | G06Q 90/20 |
| | | | 705/323 |

(Continued)

*Primary Examiner* — Olusegun Goyea

(74) *Attorney, Agent, or Firm* — Athorus, PLLC

(57) ABSTRACT

This disclosure describes, in part, techniques for calibrating positions of weight sensors for use in systems for tracking items within a facility. The techniques provide for receiving weight sensor data and image sensor data from sensors of a facility. The image sensor data is used to identify an event and corresponding data is identified from the weight sensor data to associate the weight sensor with a location identified with the event from the image data. The location may be associated with the weight sensor data for detecting and identifying items during subsequent events and interactions.

20 Claims, 7 Drawing Sheets

(56) References Cited

U.S. PATENT DOCUMENTS

| 2014/0052555 | A1* | 2/2014 | Macintosh | ............... | G07G 1/12 |
| | | | | | 705/23 |
| 2014/0074762 | A1* | 3/2014 | Campbell | .............. | G06Q 40/00 |
| | | | | | 706/46 |
| 2014/0379296 | A1* | 12/2014 | Nathan | .................. | G06V 20/52 |
| | | | | | 702/150 |
| 2015/0310601 | A1* | 10/2015 | Rodriguez | ........... | G06Q 20/208 |
| | | | | | 348/150 |
| 2021/0271413 | A1* | 9/2021 | Herzogenrath | ....... | G06F 3/0679 |

* cited by examiner

400

CONNECT SENSOR TO FIXTURE
402

ENTER FIXTURE ID
404

ENTER SENSOR ID
406

PLACE ITEM IN FIRST LOCATION
408

PLACE ITEM IN SECOND LOCATION
410

DETERMINE VALIDATION FOR ATTACHED SENSORS
412

500

RECEIVE WEIGHT SENSOR DATA
502

RECEIVE IMAGE DATA
508

RECEIVE ITEM SCAN DATA
506

DETERMINE, BASED ON THE WEIGHT DATA, AN INTERACTION
504

DETERMINE, BASED ON THE IMAGE DATA, AN EVENT AND A LOCATION
510

DETERMINE A VOLUME ASSOCIATED WITH THE SENSOR
512

DETERMINE A POSITION OF A SENSOR WITHIN THE FACILITY
514

DETERMINE A POSE OF THE SENSOR WITHIN THE FACILITY
516

CALIBRATE THE WEIGHT SENSOR
518

ITEMS
(E.G. FROM SUPPLIER(S))
604(1), 604(2), ..., 604(Q)

MATERIALS HANDLING FACILITY
602

RECEIVING AREA
606

ITEM(S)
604

IMAGING
SENSOR(S)
620(1)

STORAGE AREA 608

SENSOR(S)
620

FIELD OF VIEW
628

EVENT
624

AISLE
612

USER
616(2)

TOTE
618(1)

USER
616(1)

TOTE
618(2)

INVENTORY
LOCATION
614

TRANSITION AREA
610

INVENTORY MANAGEMENT SYSTEM
622

OUTPUT DATA(S)
626

NETWORK
630

SERVER(S)
632

CUSTOMIZED RETAIL ENVIRONMENT SENSOR CALIBRATION

BACKGROUND

Traditional physical stores maintain an inventory of items in customer-accessible areas such that customers can pick items from the inventory and take them to a cashier for purchase, rental, and so forth. For example, a customer may take an item, such as a shirt, from a rack located within the store. The customer may then take the shirt to a cashier that is located near an entrance of the store. Using a point-of-sale device, the cashier may process a transaction for a price of the shirt. For example, the cashier may input payment information, such as a card number, into the point-of-sale device, which may charge the card of the customer for the price of the shirt.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
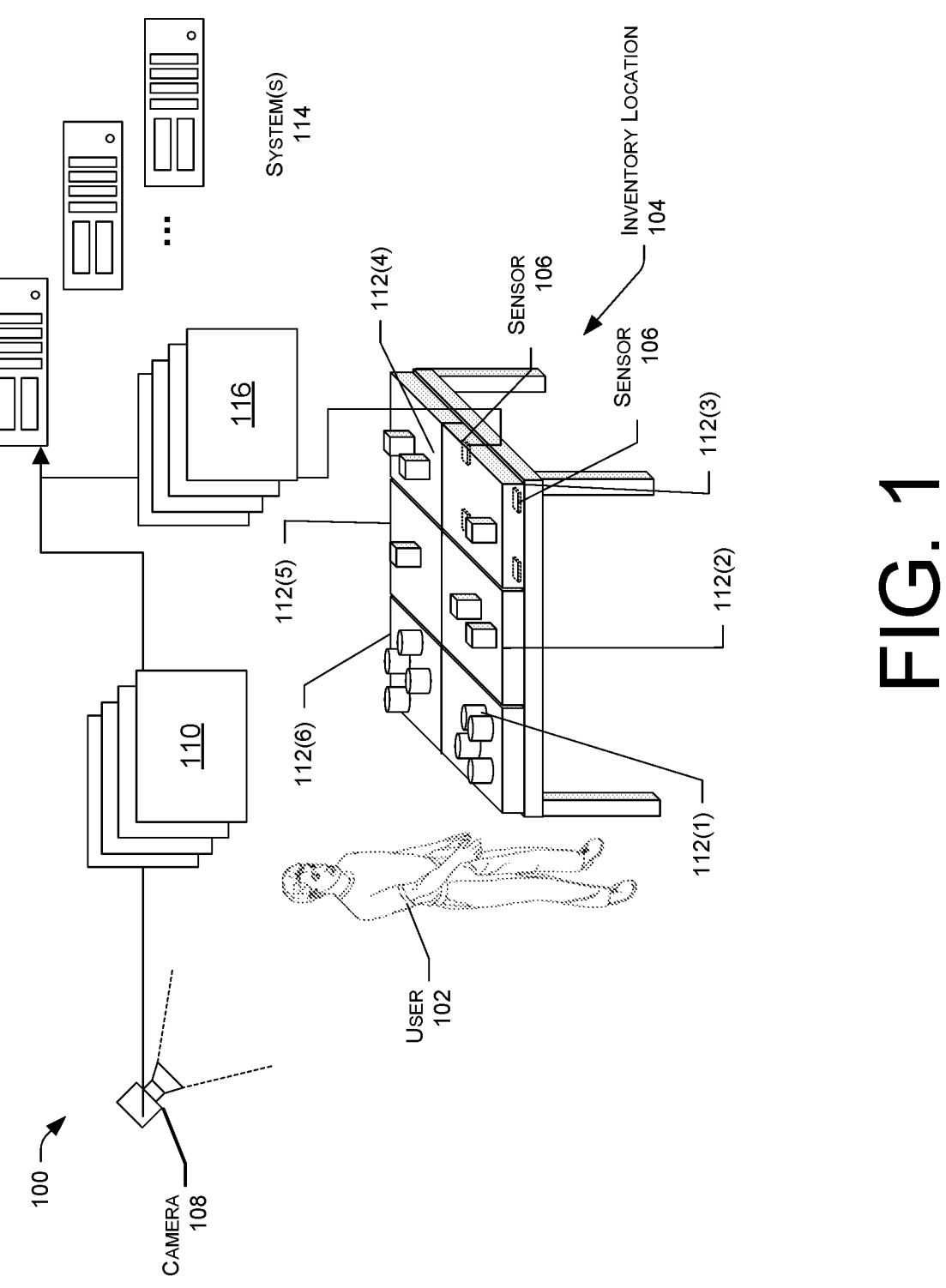
FIG. 1 illustrates an example system for automatically calibrating and determining position information for sensors and inventory locations within a facility based on interaction data, according to at least one example.

This description provides for techniques and systems for calibration load cells (e.g., weight sensors) within facilities that may be configured to track items and individuals while within the facility. The techniques described herein provide for an automated system to identify positions of load cell sensors within the facility based on other sensor information, without requiring a time-consuming calibration and setup process. For example, the facility may include cameras for visual tracking of items and individuals, but the items may be stored on locations that may be adjusted and moved over time, such as to reconfigure shelves or storage to accommodate different products and types of inventory items. Accordingly, the sensors equipped on the inventory storage locations may need to be re-calibrated for different moves such that items may be accurately detected as removed from the shelves to aid in item identification and processing.

For instance, system(s) may receive image data generated by a camera located at a facility, where the image data represents an interaction between a user and an item located at an inventory location. The system(s) may then use one or more components to analyze the image data in order to identify the interaction. Additionally, the system(s) may analyze the image data that represent the inventory location in order to detect an event, such as the user removing an item from or returning an item to the inventory location. The facility is also equipped with load cells on the inventory locations that can be used to further aid in identifying events as well as products associated with the events. The load cells on the inventory locations may move within the facility based on different display configurations, as-needed, and therefore the location of the load cells needs to remain updated such that events may be accurately identified by the image and weight sensing systems. Based on detecting the event, the system(s) may generate event data associated with the event.

In some examples, such as when an event occurs, the system(s) may determine an item type associated with the item(s). For a first example, the system(s) may store inventory data that associates inventory locations with different item types. For instance, the inventory data may indicate that a first inventory location (e.g., a first bin) maintains a first item type (e.g., oranges), a second inventory location (e.g., a second bin) maintains a second item type (e.g., bananas), a third inventory location (e.g., a third bin) maintains a third item type (e.g., pears), and/or so forth. The inventory locations may be equipped with weight sensors such that weight sensors for different sections and/or portions of the inventory locations may be triggered when the user selects an item from the particular location. The system(s) may then use the inventory data to determine the item type that is associated with the event. For instance, and using the example above, if the system(s) determine that the event includes a user removing item(s) from the first inventory location, based on image and/or weight sensor data for the first inventory location, then the system(s) may determine that the user removed orange(s) from the first inventory location. The system(s) may then generate the event data to further represent the item type.

In some examples, the system(s) may also determine the number of items removed from and/or returned to the inventory location. For a first example, the component(s) may analyze the image data in order to determine the number of items. For a second example, the system(s) may analyze sensor data generated by one or more other sensors associated with the inventory location and/or another feature of the facility (e.g., a tote, a weight scale, etc.). Based on the analysis, the system(s) may determine the number of items. For example, if the sensor(s) include weight sensor(s), the system(s) may analyze the sensor data in order to determine the weight of the item(s) removed from and/or returned to the inventory location. The system(s) may then determine the number of items based on the weight (e.g., divide the weight by the weight per item). While these are just a couple example techniques of how the system(s) may determine the number of items, in other examples, the system(s) may use additional and/or alternative techniques to determine the number of items. Additionally, in some example, the system(s) may generate the event data to further represent the number of items. Accordingly, it is important for the system to have an accurate understanding of the locations of the weight sensors with respect to the image data, such that the weight sensor data and image data may be used in conjunction, such as described herein.

In some examples, the system(s) may then associate the event with the user. However, in other examples, the system(s) may perform additional processing in order to determine that the event is associated with the user. For example, if the system(s) cannot initially determine the identity of the user that is associated with the event, the system(s) may determine that the item(s) associated with the event are currently "in-flight" (e.g., the system(s) need to identify the user that removed the item(s)). The system(s) may then analyze sensor data from one or more other sensors to determine that the item(s) are associated with the user (e.g., that the user removed and/or possesses the item(s)).

In some examples, the system(s) may then use the event data in order to update a state of a virtual cart associated with the user. For a first example, based on determining that the user is associated with the event, where the event includes removing item(s), the system(s) may update the virtual cart to indicate the addition of the item and/or the addition of the number of items. For a second example, based on determining that the user is associated with the event, where the event includes returning item(s), the system(s) may update the virtual cart to indicate the removal of the item and/or the removal of the number of items. The system(s) may then use the virtual cart of the user in order to process a transaction for item(s) added to the virtual cart, such as when the user exits the facility.

Additionally, while the examples herein describe the inventory locations as including shelves, tables, bins, and/or the like that may be equipped with weight sensors, in other examples, similar processes may be performed to identify interactions and/or events associated with other types of inventory locations. In some examples, the weight sensors and/or inventory locations may be reconfigurable to change shapes, heights, storage locations, and types of inventory locations using the weight sensors. In some examples, the weight sensors may be movable between different inventory locations and/or movable within inventory locations and/or moved when inventory locations are adjusted. Accordingly, the systems provided herein enable flexibility to provide a facility with flexibility and ability to easily and quickly move and reconfigure the facility area without a long and complicated re-learning process for the system to relearn the locations of the inventory locations and associated weight sensors.

In an example, the location of the load cells (e.g., weight sensors) may be calibrated through a process. Calibration may, in this description, refer to establishing position and pose information for weight sensors within the facility. The process may include a user, such as an associate of the facility, picking an item off of the inventory location, scanning an identifier of the item with a user device, and returning the item to the inventory location. When adding or moving a weight sensor, such as when moving or reconfiguring space within the facility, the user may perform the pick-scan-return process for the inventory locations thereby triggering a learning process for the system to automatically calibrate and learn the locations for the weight sensors, product volumes, and items on the shelves. In some examples, the locations and/or positions and/or poses of the weight sensors, items, and/or product volumes (e.g., defining spaces or volumes where products are contained) may be determined with confidence scores that may be used to identify when locations may be refined using subsequent event and/or interaction data. Thereby, the system may recalibrate the weight sensors using customer interaction events.

In some examples, the user may scan the product after picking it from a shelf and the system may identify the "pick" event associated with the user selecting the item. The system will further identify a location of the event as well as registering the event using a weight sensor. Using this information, the system may resolve the position of the weight sensor without requiring a manual calibration process for each sensor. In some examples, the user may pick and scan the item without returning the item, and may also pick and return items without scanning the item after picking. In this manner, the weight sensor still registers the event and the image data may be used to identify the locate the weight sensor within the facility.

The location of the weight sensor within the facility may include a position and a pose for the weight sensor. The position may include a three-dimensional location within the facility, such as coordinates for position in an X, Y, and Z direction. The position may also be determined relative to other structures, items, or locations within the facility. In some examples, the position may include an absolute location based on GPS coordinates for the location as well as altitude information. The location of the weight sensor may also include the pose of the weight sensor. For example, a shelf may have two or four weight sensors configured to weight the items on the shelf, the pose may include the orientation of the weight sensors, such as which side faces outward on the shelf In this manner, the locations may be used to identify the sides and front and back of the shelf location.

In some examples, data used to calibrate the weight sensors, as well as additional data gathered by the weight sensors and the other sensors of the facility (e.g., the image data) may be aggregated to refine the position and pose of the weight sensors within the facility.

The techniques described herein provide for inventory location and associated weight sensor, or other such sensor, position and pose information to be automatically associated with the image data of the facility. The techniques herein reduce reliance on typical markers such as visible markers that other systems may use to identify and determine such position information using only image data. Without such visible markers, product volumes for the weight sensors (e.g., volumes defining spaces where products measured by the weight sensors) can be defined without requiring explicit input of weight sensor locations. The product volumes may be defined and attached or associated with particular sensors and the position and/or associations may be refined through an iterative process based on additional information through subsequent events.

One benefit of the system includes enabling a facility to quickly move inventory locations to respond to display changes and/or demand that may be a result of seasonal shifts, product supply, disruptions, or other such changes to the flow and/or contents of the facility. The techniques herein enable the facility to move and/or adjust inventory locations and rapidly scan products to calibrate the new locations of the inventory locations with minimal interruption to the customer experience.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes. The operations may include receiving image data generated by a camera, the image data representing a user interacting with a product at an inventory location within a facility and determining a product volume associated with the inventory location based on the image data, the product volume defining a space where one or more products are placed at the inventory location. The operations may also include determining a first interaction with a product from the product volume based on the image data. The operations may further include receiving weight data from a weight sensor coupled to the inventory location, the weight sensor reconfigurable with the inventory location such that the inventory location supports products in one or more configurations and is movable within the facility, and determining a second interaction based on the weight data; determining a location of the weight sensor based on the first interaction, the product volume, and the second interaction. The operations may also include storing an association between the location of the weight sensor and the product volume. Other embodiments of this aspect include corresponding computer systems, apparatus, and computer programs recorded on one or more computer storage devices, each configured to perform the actions of the methods.

Implementations may include one or more of the following features. The operations may also include determining an identifier associated with the product based on a scan of the product by a user device associated with the user, and storing the association between the location of the weight sensor and the product volume further may include an association with the identifier of the product. In some examples, determining the first interaction may include determining a first timestamp associated with the first interaction based on the image data, determining the second interaction may include determining a second timestamp associated with the second interaction, and determining the location of the weight sensor may include associating the first interaction with the second interaction based on the first timestamp differing from the second timestamp by less than a threshold period of time.

In some examples, a method may include determining, based at least in part on image data from a camera within a facility, a first event associated a first interaction with an item at an inventory location. The method may also include determining a location associated with the first event based at least in part on the image data. The method also includes determining, based at least in part on weight data from a weight sensor coupled to the inventory location, a second event. The method further includes determining, based at least in part on the first event and the second event, that the first event coincides with the second event. The method may also include determining, in response to the first event coinciding with the second event, a position of the weight sensor within the facility. The method further includes storing an association between the position of the weight sensor and the inventory location. Other embodiments of this aspect include corresponding computer systems, apparatus, and computer programs recorded on one or more computer storage devices, each configured to perform the actions of the methods.

In some examples, the first interaction may include removal of the item at the inventory location, the second event may include a removal of a weight from a structure coupled to the weight sensor, and determining that the first event coincides with the second event may include determining that the removal of the item corresponds to the removal of the weight. Determining that the first event coincides with the second event may be based at least in part on a first timestamp associated with the first event and a second timestamp associated with the second event. Determining that the first event coincides with the second event may be based at least in part on a first duration of the first event and a second duration of the second event, the second duration being within a threshold amount of the first duration. The position of the weight sensor may include a position and a pose of the weight sensor within the facility. The first interaction may include a user picking, scanning, and returning the item, the second event may include an item being removed and replaced on a structure coupled to the weight sensor, and determining the first event coincides with the second event may include determining that the item being removed and replaced on the structure coincides with the first interaction. The image data and the weight data may be associated with a first time, and the method may include determining, based at least in part on second image data at a second time later than the first time and from the camera within the facility, a third event associated with a second interaction with a second item at the inventory location, and determining a second location associated with the third event based at least in part on the second image data, determining, based at least in part on second weight data from the weight sensor, a fourth event; and refining, based at least in part on the third event and the fourth event, the position of the weight sensor within the facility. Determining the location may include determining a product volume defining a space for the item at the inventory location, and where storing the association between the position and the inventory location may include an association between the product volume and the position of the weight sensor. Storing the association may include storing an association between the product volume and the product identifier. The method as recited may include identifying one or more items removed from the product volume based on weight data from the weight sensor and the association between the product volume and the product identifier.

Turning now to the figures, FIG. 1 illustrates an example system 100 for automatically calibrating and determining position information for sensors 106 and inventory locations 104 within a facility based on interaction data, according to at least one example. For instance, the facility may include a camera 108 that is configured to generate image data 110 representing at least the inventory location 104. The inventory location 104 may be equipped with load cells (e.g., weight sensors shown as "sensors 106") that are configured to generate weight data 116 representing weights of items resting at the inventory location 104. In the example of FIG. 1, the inventory location 104 includes a number of bins 112(1)-(4) (also referred to as "bins 112"), where each bin 112 maintains a specific type of item. In some examples, each bin 112 may include its own inventory location. System(s) 114 may then receive the image data 110 from the camera 108 and weight data 116 from the sensors 106 associated with the bins 112.

The system 100 may identify an interaction between a user 102 and at least one of the bins 112. For instance, the system(s) 114 (e.g., the component(s) described herein) may determine that the image data 110 represents the user 102. The system(s) 114 may then process the image data 110 using one or more image recognition and/or machine learning techniques to identify the interaction(s) between the user 102 and the bins. Based on the determination, the system(s) 114 may identify a first interaction between the user 102 and the first bin 112(1). In an illustrative example, the user 102 may be an associate picking an item off of the inventory location 104, scanning an identifier of the item with a user device, and returning the item to the inventory location 104. For example, the inventory location 104 may have been re-configured and/or moved within the example system 100 such that calibration of the location of the sensors 106 is needed to accurately associate the weight data 116 and the image data 110. When adding or moving a weight sensor, such as when moving or reconfiguring space within the facility, the user 102 may perform the pick-scan-return process for the bin 112(1) thereby triggering a learning process for the system to automatically calibrate and learn the locations for the weight sensors, product volumes, and items associated with bin 112(1).

In some examples, the user 102 may scan the product after picking it from a shelf and the system 114 may identify the "pick" event associated with the user selecting the item. The system 114 will further identify a location of the event as well as registering the event using a sensor 106. Using this information, the system 114 may resolve the position of the sensor 106 without requiring a manual calibration process for each sensor 106. The user 102 may replace the item after scanning, and the sensor 106 may register the removal and return of the item to the bin 112(1). In some examples, the system(s) 114 may then generate event data representing at least the first event. For instance, the event data may represent the event type (e.g., removing an item) the period of time that the interaction and/or event occurred, a location of the event (e.g., the first bin 112(1)), an identity of the user 102, and/or the like.

The system 114 may identify the location of the item that was picked up based on data from the four sensors 106, as illustrated. For example, using the four weight sensors and the distribution of weight across the sensors, the position along the shelf may be determined based on the proportion of weight removed from each of the weight sensors. This may be used to provide a two dimensional location of the item on the shelf.

The system 114 may determine, based on a timestamp of the event from the image data 110 and from a timestamp of the weight data 116 indicating the corresponding removal and replacement of an item, that the sensor 106 is associated with the bin 112(1). In some examples, the duration of the event may also be used to match the duration of time when the item was removed from the bin 112(1) before being replaced. Accordingly, the features of the image data 110 and the weight data 116 may be used to identify weight sensors associated with the bins 112 and thereby calibrate the system 114 to understand the location of the sensors 106 relative to the image data 110.

Figure 3A:
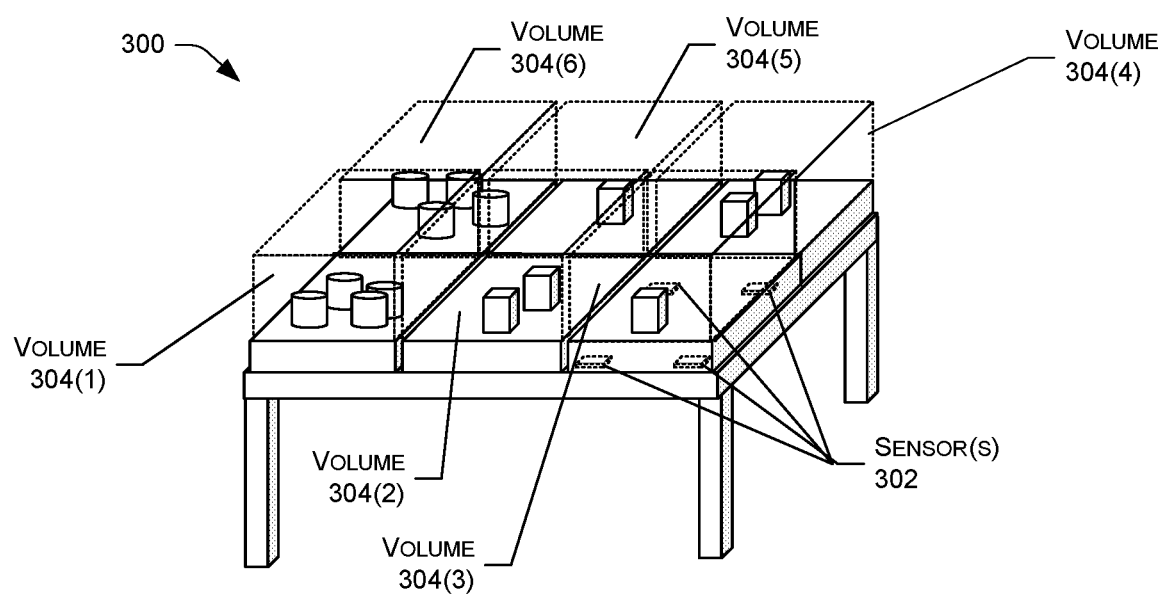
FIG. 3A illustrates an example inventory location that may have sensors configurable for different orientations and configurations, according to at least one example.
Figure 3B:
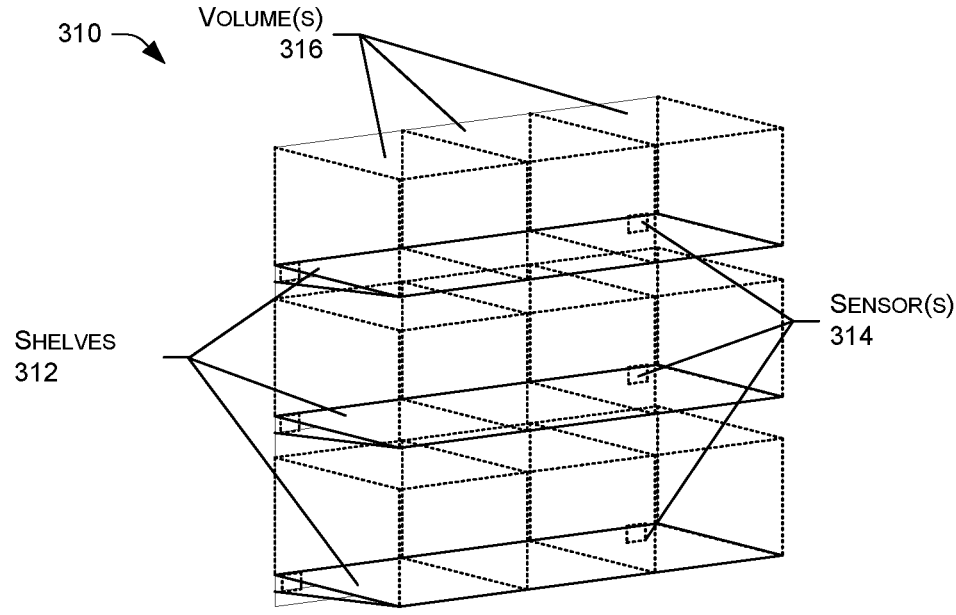
FIG. 3B illustrates an example inventory location that may use sensors similar to those of FIG. 3A and be configurable in different orientations, according to at least one example.

In some examples, the system(s) 114 may also identify the item type associated with the removed item. For a first example, the system(s) 114 may store inventory data indicating that the first bin 112(1) maintains a first item type (e.g., oranges), the second bin 112(2) maintains a second item type (e.g., bananas), the third bin 112(3) maintains a third item type (e.g., pears), and the fourth bin 112(4) maintains a fourth item type (e.g., peaches). As such, since the system(s) 114 determined that the first event includes the user 102 removing the item from the first bin 112(1), the system(s) 114 may determine that the item type that was removed by the user 102 includes the first item type (e.g., an orange). Additionally, in some examples, the system(s) 114 may generate the event data to further represent the item type. The item type may be associated with the bins 112 as well as the corresponding sensors 106 such that product volumes (e.g., as illustrated in FIG. 3A and FIG. 3B) may be correctly identified with the corresponding items and sensors 106.

Figure 2:
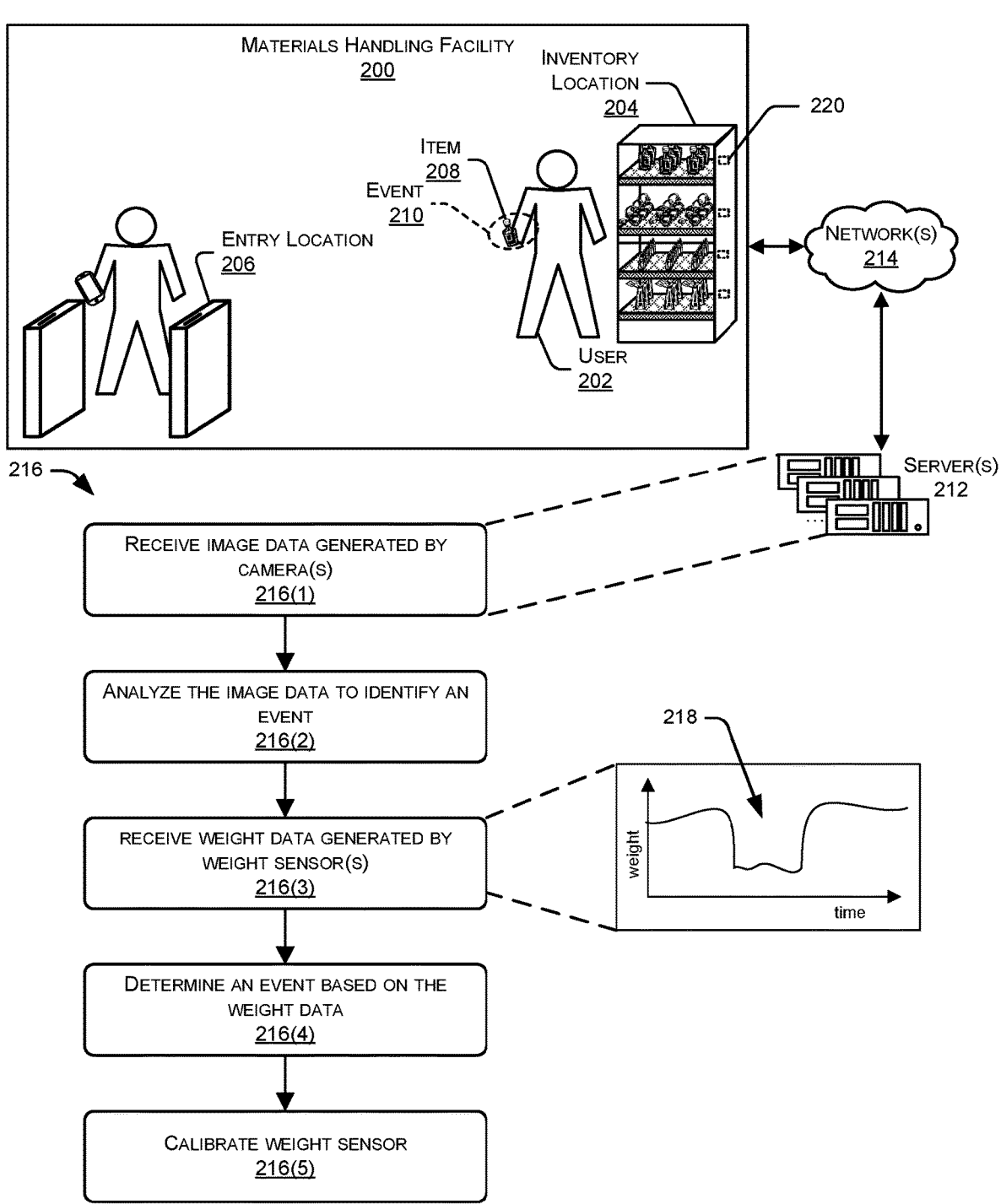
FIG. 2 illustrates an example of identifying interactions and events associated with inventory locations for calibrating sensors of a facility, according to at least one example.

FIG. 2 illustrates an example of identifying interactions and events associated with inventory locations for calibrating sensors of a facility, according to at least one example. A materials handling facility 200 is shown in FIG. 2 that may include one or more systems to identify items and track removal of items by users within the facility. FIG. 2 further illustrates an operation 216 that the system may implement for calibrating the system to identify the position and pose of the sensors 220 (e.g., weight sensors or other sensors) with the image date from cameras of the materials handling facility.

As FIG. 2 depicts, the user 202 may have engaged in a shopping session in the materials handling facility 200. For instance, the user 202 may have selected an item 208 from an inventory location 204 (e.g., shelf, aisle, etc.) equipped with a sensor 220. The inventory location 204 may house one or more different types of items 208 and the user 202 may pick (i.e., take, retrieve, etc.) one or more of these items 208.

As illustrated, the materials handling facility 200 (or "facility") may have one or more entry locations 206, such as lanes. The entry location 206 may be defined by a gate in some examples and may include a movable barrier to control movement of users 202. For example, the gate may include computer-controlled panels that may be closed to impede passage of the users 202 or opened to permit passage of the user 202.

Once a user has entered the materials handling facility, items 208 selected by the user 202 will be identified by the system and added to a virtual shopping cart for the user 202. The user 202 may retrieve items from the inventory location 204. Additionally, the user may put the items 208 back in an inventory location 204, such as when the user 202 changes their mind regarding their desire to purchase or otherwise acquire the item 208.

Once the user 202 has finished their shopping session, the user 202 may end the shopping session in various ways. For instance, the user 202 may return a cart to a cart corral, provide input to the cart indicating an end of the shopping session (e.g., utterance, utilize a user interface element on a touch display, etc.), or simply remove item bags or other item carriers from the cart and leave the facility 200. After the user 202 has ended their shopping session, the list of item identifiers in the virtual shopping cart may be uploaded to one or more remote servers 212, over one or more networks 214, that manage user accounts for users 202 of the facility 200. The server(s) 212 may charge the appropriate user account for the listing of the items in the virtual shopping cart that the user took from the facility 200. For instance, the server(s) 212 may be configured to determine or generate information indicative of a cost of the items 208 picked by the user 202. Additionally, the server(s) 212 may store payment information (e.g., credit card information, bank account information, etc.) for each user account. In this way, when the user 202 finished their shopping session and the cart sends the listing of item identifiers in the virtual shopping cart over the network(s) 214 to the server(s) 212, the server(s) 212 may be configured to determine a cost or price for all of the listed item identifiers, and charge the user via their payment information for the items 208 selected during their shopping session. In this way, the user 202 need not go through steps of a traditional check-out experience (e.g., waiting in line for a cashier, scanning items with the cashier, paying for items at the cashier, etc.).

The network(s) 214 may include private networks such as an institutional or personal intranet, public networks such as the Internet, or a combination thereof. The network(s) 214 may utilize wired technologies (e.g., wires, fiber optic cable, and so forth), wireless technologies (e.g., radio frequency, infrared, acoustic, optical, and so forth), or other connection technologies. The network(s) 214 is representative of any type of communication network, including one or more of data networks or voice networks. The network(s) 214 may be implemented using wired infrastructure (e.g., copper cable, fiber optic cable, and so forth), a wireless infrastructure (e.g., cellular, microwave, satellite, etc.), or other connection technologies.

As noted above, in some examples, the servers 212 may perform some or all of the operations described below. While the servers 212 are illustrated as being in a location outside of the facility 200, in other implementations, at least a portion of the servers 212 may be located at the facility 200.

In some instances, the servers 212 may perform the operations of the operation 216 during and/or after a shopping session of the user 202. While the following description describes the operation as being performed by the servers 212, it is to be appreciated that these operations may occur at other devices in other implementations.

At an operation 216(1), the servers 212 receive image data generated by one or more cameras, such as one or more cameras mounted within the materials handling facility 200 or the like.

At an operation 216(2), the servers 212 may analyze the generated image data to identify an event. For example, the image data may be analyzed to determine a motion vector indicating a direction of the item(s) as they are placed into or removed from the inventory location 204, which may be used to determine an action taken with respect to the item 208. Further, the image data may be analyzed to determine a quantity of each item placed into or removed from the basket. In still other instances, sensor data from one or more other sensors may be used to determine event outcomes.

It is further noted that, in some instances, the servers 212 may refrain from attempting to determine the outcome of an event until a weight of the inventory location 204, as reported by one or more sensors 220 has stabilized and/or until activity within the inventory location 204 has ceased. For example, the servers 212 may wait until a weight-change component outputs an indication that the current weight estimation is stable. In addition, or in the alternative, the servers 212 may wait to determine the outcome of an event until the servers 212 receives an indication that activity has ceased within the inventory location 204. For example, an activity-detection component may analyze the image data generated by the one or more cameras and may output an indication when activity has ceased. By awaiting this indication, the server 212 does not attempt to determine an outcome of an event until the event is likely to have been completed.

At an operation 216(3), the servers 212 may receive weight data generated by one or more weight sensors 220. As illustrated, the weight sensors may maintain a continuous or periodic weight reading of the inventory location 204, which the servers 212 may use to determine the outcomes of events involving the placing items into or removing items from inventory location 204.

At an operation 216(4), after determining that a weight change that is greater than a threshold value has occurred and determining that the weight estimation is stable, the servers 212 determine an event associated with the identified item(s) based at least in part on the determined weight data. For example, the servers 212 may use information such as the weight-change data, the identifier of the item, the current contents of the virtual cart of the user, and/or the like.

At an operation 216(5), the servers 212 may calibrate the sensors 220 by identifying a position of the sensors 220 with respect to the image data, and thereby identify the position and pose of the sensors 220 with respect to the inventory location 204 and product volumes associated therewith. Calibration may, in this description, refer to establishing position and pose information for weight sensors within the facility.

In an example, the location of the sensors 220 may be calibrated through a process. When adding or moving a weight sensor, such as when moving or reconfiguring space within the facility, the user may perform the pick-scan-return process for the inventory locations thereby triggering a learning process for the servers 212 to automatically calibrate and learn the locations for the sensors 220, product volumes, and items on the shelves. In some examples, the locations and/or positions and/or poses of the sensors 220, items, and/or product volumes (e.g., defining spaces or volumes where products are contained) may be determined with confidence scores that may be used to identify when locations may be refined using subsequent event and/or interaction data. Thereby, the system may recalibrate the weight sensors using customer interaction events.

For instance, servers 212 may receive image data generated by a camera located at the materials handling facility 200, where the image data represents an interaction between a user 202 and an item 208 located at an inventory location 204. The servers 212 may then use one or more components to analyze the image data in order to identify the interaction. Additionally, the servers 212 may analyze the image data that represent the inventory location 204 in order to detect an event, such as the user 202 removing an item 208 from or returning an item 208 to the inventory location 204. The sensors 220 of the inventory location 204 can be used to further aid in identifying events as well as products associated with the events. The sensors 220 may move within the facility based on different display configurations, as-needed, and therefore the location of the sensors 220 needs to remain updated such that events may be accurately identified by the image and weight sensing systems. Based on detecting the event, the servers 212 may generate event data associated with the event.

In some examples, such as when an event occurs, the servers 212 may determine an item type associated with the item 208. For a first example, the servers 212 may store inventory data that associates inventory locations with different item types. For instance, the inventory data may indicate that an inventory location maintains a first item type. The inventory location 204 may be equipped with weight sensors 220 such that weight sensors 220 for different sections and/or portions of the inventory location 204 may be triggered when the user 202 selects an item 208 from the particular location. The servers 212 may then use the inventory data to determine the item type that is associated with the event. For instance, and using the example above, if the servers 212 determine that the event includes a user removing item(s) from the first inventory location, based on image and/or weight sensor data for the first inventory location, then the servers 212 may determine that the user removed orange(s) from the first inventory location.

FIG. 3A illustrates an example inventory location 300 that may have sensors 302 configurable for different orientations and configurations, according to at least one example. The inventory location 300 may include a table, or other such display for presenting and/or storing items in a substantially horizontal manner. The inventory location 300 includes a number of sections, identified with volumes 304(1)-304(6) (collectively "volumes 304"). The volumes 304 may be divided, such as between bins or sections. The volumes 304 may not be separated by physical dividers in some examples, but may be separate, such that the supporting structures for the different volumes 304 may be independent of each other. In some examples, the supporting structure may not be segmented but may be continuous.

As illustrated, the supporting structure of the inventory location 300 includes sensors 302. Though sensors 302 are only illustrated with respect to volume 304(3), similar sensors may be located throughout the inventory location 300. The volumes 304 may define product volumes where items may be placed and be detected by corresponding sensors 302. Product volumes for the weight sensors (e.g., volumes defining spaces where products measured by the weight sensors) can be defined without requiring explicit input of weight sensor locations. The product volumes may be defined and attached or associated with particular sensors and the position and/or associations may be refined through an iterative process based on additional information through subsequent events.

The system 114 may identify the location of the item that was picked up based on data from the four sensors 302, as illustrated. For example, using the four weight sensors and the distribution of weight across the sensors, the position along the shelf may be determined based on the proportion of weight removed from each of the weight sensors. This may be used to provide a two-dimensional location of the item on the shelf.

In an example, after the inventory location 300 is moved within a facility, and or re-configured, such as to change the arrangement, shape, and/or layout of areas where items may be stored, the systems described herein may be used to associate the sensors 302 with the product volumes 304.

FIG. 3B illustrates an example inventory location 310 that may use sensors 314 similar to the sensors 302 of FIG. 3A and be configurable in different orientations, according to at least one example. The inventory location 310 includes shelves 312 that couple to a support and may have sensors 314 that are used to weight portions of an/or entire shelves of the inventory location 310. Accordingly, after the height of the shelves is adjusted, or shelves are added, removed, or reconfigured to accommodate items of different sizes, the sensors 314 are calibrated to correspond to the volumes 316 as described herein to be used for item identification and tracking within the facility.

The sensors 314 may be coupled between the support structure of the shelves and the shelves 312 such that the weight of the shelves 312 is registered by the sensors 314. In the configuration of FIG. 3B, the one-dimensional position of an item removed from the shelves 312 may be determined based on the relative change in readings at the two sensors 314 coupled to the particular shelf. This may identify the volume 316 as the one-dimensional direction is along the length of the shelf.

Figure 4:
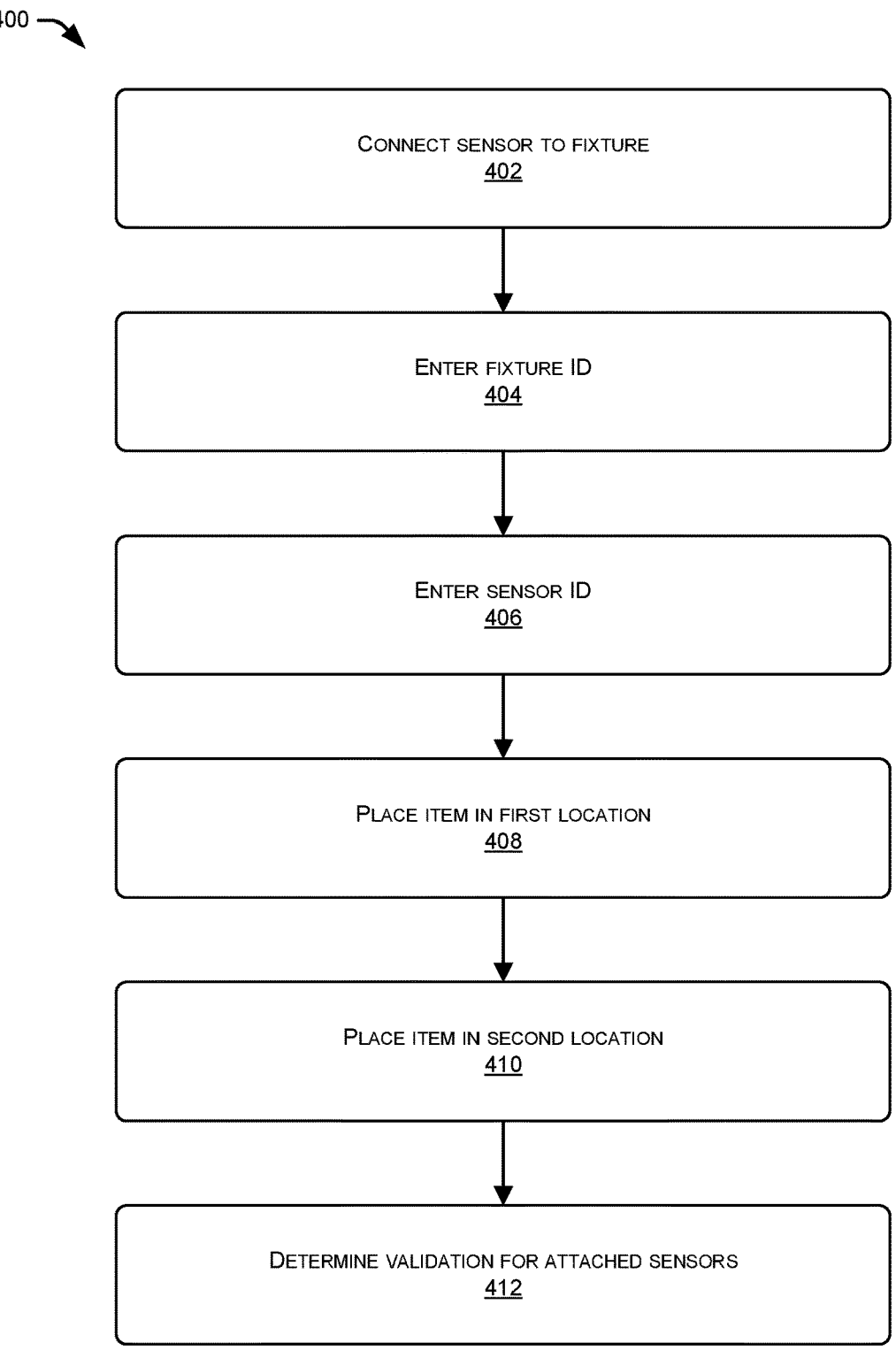
FIG. 4 illustrates an example process for calibrating a sensor when attached to a fixture, according to at least one example.
Figure 5:
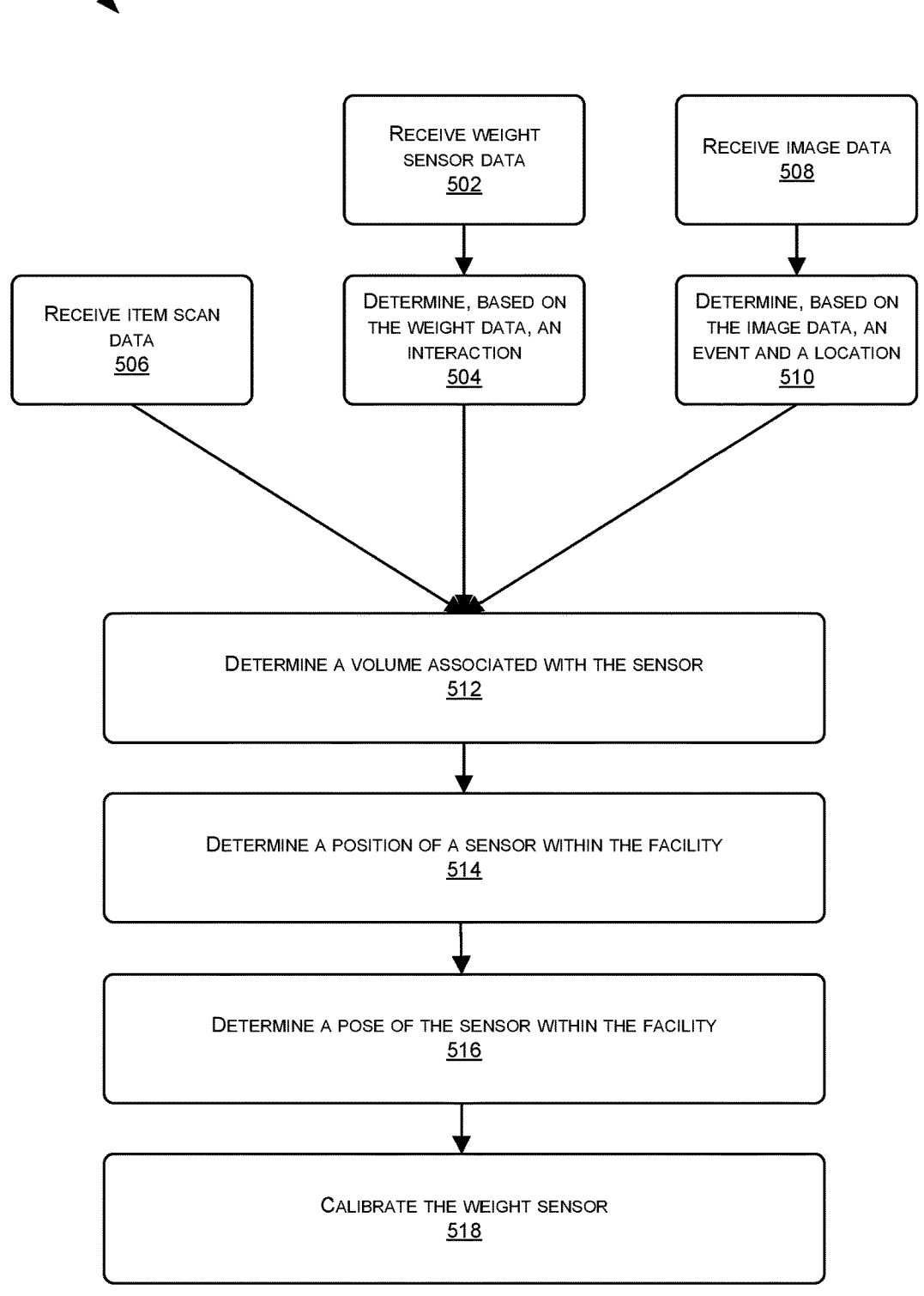
FIG. 5 illustrates an example process for automatically determining a position and pose of a sensor within a facility, according to at least one example.

FIGS. 4-5 illustrate various processes for identifying interactions and events. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed.

FIG. 4 illustrates an example process 400 for calibrating a sensor when attached to a fixture, according to at least one example. At 402, the process 400 includes connecting a sensor to a fixture. The sensor may be a weight sensor connected to an inventory location, for example as shown with respect to FIGS. 3A-3B. The sensor may be connectable to different types of inventory locations and reconfigurable to move around, such as being connected to movable platforms or shelves, and the like.

At 404, the process 400 includes entering a fixture identifier. The fixture identifier may be an identifier associated with the inventory location and may be entered by a user through a user device. In some examples, the user may scan a barcode or other identifier of the fixture. At 406, the process 400 includes entering a sensor identifier. The sensor identifier may identify the type of sensor and may also uniquely identify the sensor, such as to tie it with a unique serial number. The sensor identifier may be entered or scanned using a user device when configuring the inventory location.

At 408, the process 400 includes placing an item in a first location on the assembled inventory location. The item may be placed on a shelf or other such supporting structure. At 410, the process 400 includes removing the item from the first location and placing the item at a second location on the inventory location, such as from one end of a shelf to a second end of the shelf. In this manner, one or more weight sensors attached to the shelf may be validated at 412. The attached sensors may be detected by a system that receives weight sensor data for performing one or more processes as described herein. As the item is placed at the different locations on the shelf, the system may determine whether the sensors are gathering weight sensor data. For instance, the first location may be at a left end and the second location at a right end. The user may be instructed to place the item at the first and second locations through a user device connected, through a network, with the system. The system may, based on detecting the weight of the item using the weight sensors, validate that the sensors are connected properly and are providing weight information to the system. In some examples, third and fourth locations may also be used, for example to calibrate to identify positions of items along a depth as well as a length of a shelf. The additional locations may provide additional refinement as well as additional data for calibrating the weight sensors.

FIG. 5 illustrates an example process 500 for automatically determining a position and pose of a sensor within a facility, according to at least one example. The process 500 includes data coming from different sources, including data from one or more cameras, for example the cameras of the facility of FIG. 1, from weight sensors such as described herein, as well as product information from a user device such as a smartphone or barcode scanner. The different sources of data are received by one or more systems of the facility and used for the process 500 as described herein. In some examples, the process 500 may be triggered or begin by the system identifying an event using image data and/or by the system identifying an item removed from the shelf based on weight data.

At 502, weight sensor data is received from the weight sensor at the systems of the facility. The weight sensor data may include weight sensor data over time, including time-stamps coordinated with a central clock that other systems of the facility are coordinated with as well. At 504, the system may determine, based on the weight sensor data, an inter-action with an inventory location, such as picking or replac-ing items at the location. The system may also determine, based on the weight sensor data, a time for the event and may thereby identify a window of time for identifying an event from other data, such as the image data. The system may also determine a location, such as a location along a shelf and/or hanging structure as described with respect to FIG. 3.

At 506, item scan data may be received from a user device such as a scanner or smartphone used by an associate who picked an item from a shelf to scan and replace as part of the process 500 for calibrating the weight sensors. The item scan data may identify details regarding the product such as the identify, size, weight, and other characteristics of the item, including planogram location information for a location within the facility.

At 508, the image data may be received from one or more cameras of the facility. The image data may be used to determine an event and an associated location at 510, as described herein. The event may be determined as described with respect to FIGS. 6 and 7 herein. The event may also be associated with a time that may be used to correlate the weight sensor data and the image data events. The system may also determine, based on the image data, a product volume associated with the event, such as a location on the shelf where the item was removed and/or placed.

At 512, the process includes determining a volume asso-ciated with the sensor. The volume may include the product volume identified as described herein.

At 514, the process 500 includes the system receiving the weight sensor data, the interaction data, image data, event data, location data, and item information as received and/or accessed above. The process determines a position of a sensor within the facility based on the received data. The location and event information from the image data may be correlated with the weight sensor data and the item scan data to identify the event as corresponding to the item selected by the user and the selected item being associated with the weight sensor data, which may reflect a decrease in the weight of items at the inventory location. The association may be made as described herein, based on timestamp data, duration data (e.g., duration of time when an item is removed and replaced at the shelf) and other such informa-tion that may be used to correlate the activity from the different sensor systems. The position of the sensor may be determined as associated with a product volume identified with the event using the image tracking system of the facility. At 516, the pose of the sensor may be determined, the pose describing a pose for the weight sensor based on the received information. At 518, the volume may be associated with the sensor such that items detected by the sensor and/or identified as removed from the volume may be identified using the visual as well as the weight sensor systems described herein. The association of the volume may be used to calibrate the weight sensor as described herein, for example to determine the three-dimensional position and pose of the sensor with respect to the image data from the system.

Figure 6:
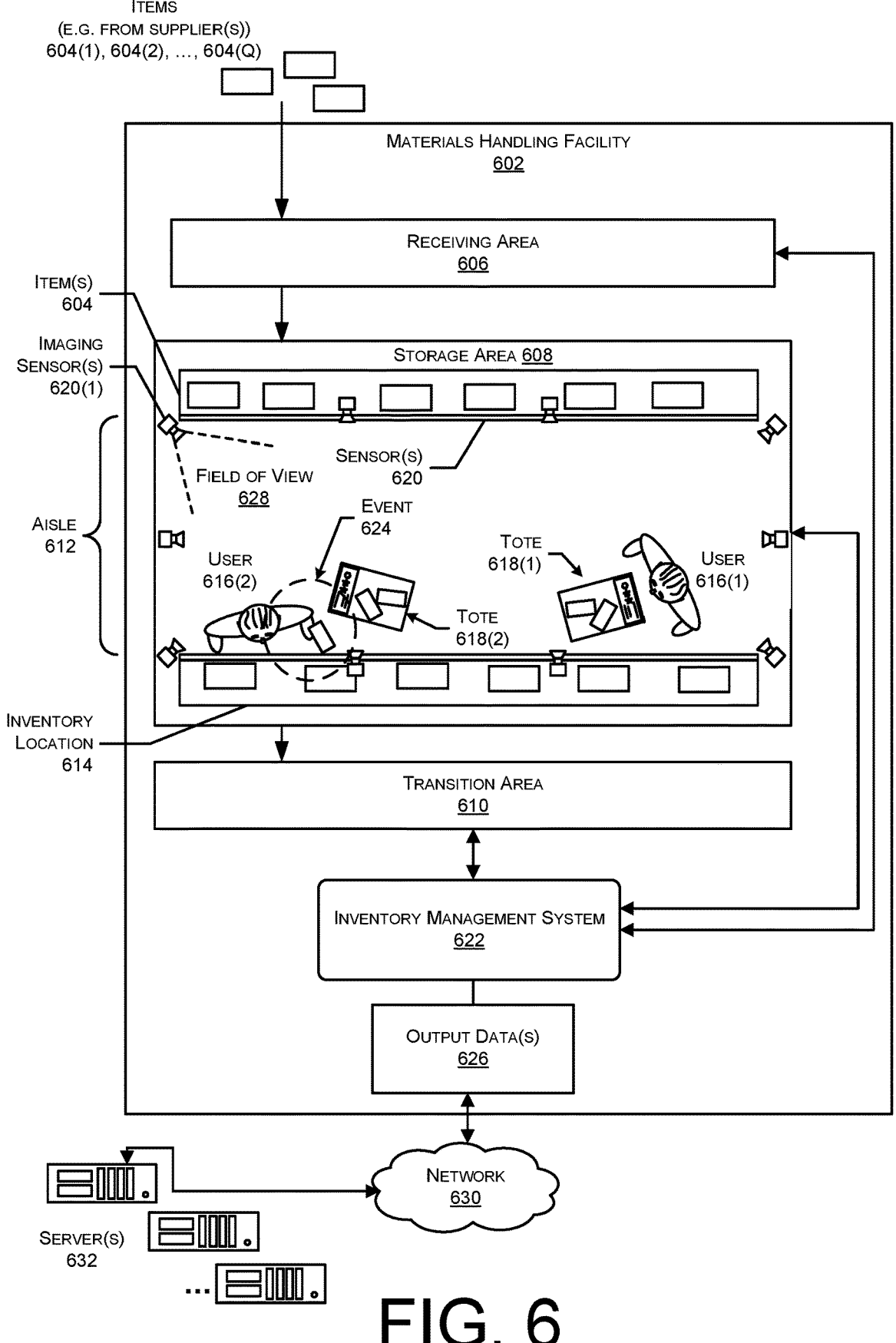
FIG. 6 is a block diagram of an example materials handling facility that includes sensors and an inventory management system configured to generate output regarding events occurring in the facility using the sensor data, according to at least one example.
Figure 7:
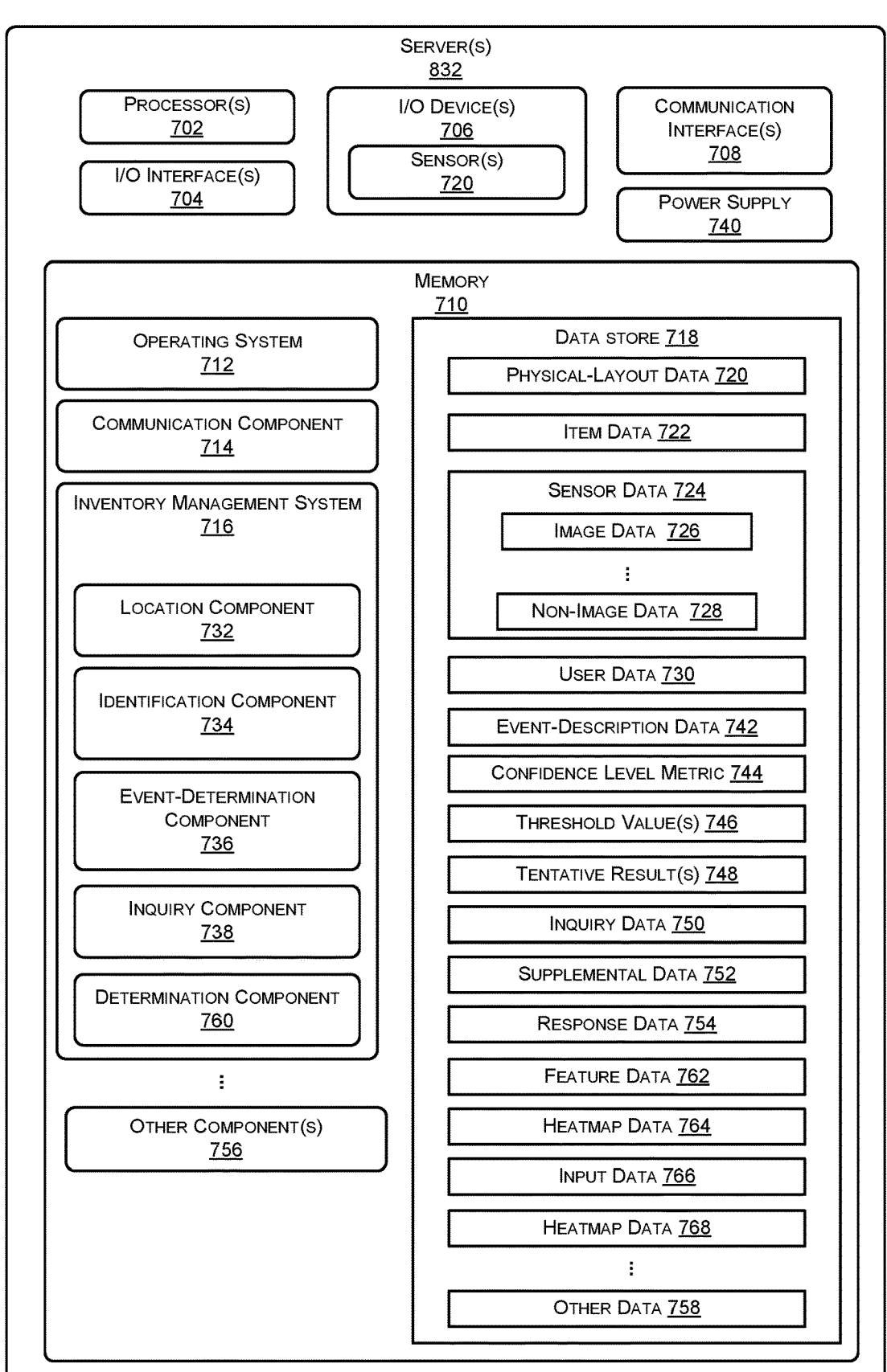
FIG. 7 illustrates a block diagram of one or more servers configured to support operation of the facility, according to at least one example.

FIGS. 6 and 7 represent an illustrative materials handling environment, such as the materials handling facility 602, in which the techniques described herein may be applied to cameras monitoring the environments as described below. However, the following description is merely one illustrative example of an industry and environment in which the techniques described herein may be utilized. The materials handling facility 602 (or "facility") comprises one or more physical structures or areas within which one or more items 604(1), 604(2), . . . , 604(Q) (generally denoted as 604) may be held. As used in this disclosure, letters in parentheses such as "(Q)" indicate an integer result. The items 604 comprise physical goods, such as books, pharmaceuticals, repair parts, electronic gear, groceries, and so forth.

The facility 602 may include one or more areas desig-nated for different functions with regard to inventory han-dling. In this illustration, the facility 602 includes a receiv-ing area 606, a storage area 608, and a transition area 610. The receiving area 606 may be configured to accept items 604, such as from suppliers, for intake into the facility 602. For example, the receiving area 606 may include a loading dock at which trucks or other freight conveyances unload the items 604.

The storage area 608 is configured to store the items 604. The storage area 608 may be arranged in various physical configurations. In one implementation, the storage area 608 may include one or more aisles 612. The aisle 612 may be configured with, or defined by, inventory locations 614 on one or both sides of the aisle 612. The inventory locations 614 may include one or more of shelves, racks, cases, cabinets, bins, floor locations, or other suitable storage mechanisms for holding or storing the items 604. The inventory locations 614 may be affixed to the floor or another portion of the facility's structure, or may be movable such that the arrangements of aisles 612 may be reconfig-urable. In some implementations, the inventory locations 614 may be configured to move independently of an outside operator. For example, the inventory locations 614 may comprise a rack with a power source and a motor, operable by a computing device to allow the rack to move from one location within the facility 602 to another.

One or more users 616(1), 616(2) (generally denoted as 616), totes 618(1), 618(2) (generally denoted as 618) or other material handling apparatus may move within the facility 602. For example, the users 616 may move about within the facility 602 to pick or place the items 604 in various inventory locations 614, placing them on the totes 618 for ease of transport. An individual tote 618 is config-ured to carry or otherwise transport one or more items 604. For example, a tote 618 may include a basket, a cart, a bag, and so forth. In other implementations, other agencies such as robots, forklifts, cranes, aerial drones, and so forth, may move about the facility 602 picking, placing, or otherwise moving the items 604.

One or more sensors 620 may be configured to acquire information in the facility 602. The sensors 620 in the facility 602 may include sensors fixed in the environment (e.g., ceiling-mounted cameras) or otherwise, such as sen-sors in the possession of users (e.g., mobile phones, tablets, etc.). The sensors 620 may include, but are not limited to, cameras 620(1), weight sensors, radio frequency (RF) receivers, temperature sensors, humidity sensors, vibration sensors, and so forth. The sensors 620 may be stationary or mobile, relative to the facility 602. For example, the inventory locations 614 may contain cameras 620(1) configured to acquire images of pick or placement of items 604 on shelves, of the users 616(1) and 616(2) in the facility 602, and so forth. In another example, the floor of the facility 602 may include weight sensors configured to determine a weight of the users 616 or another object thereupon.

During operation of the facility 602, the sensors 620 may be configured to provide information suitable for tracking how objects move or other occurrences within the facility 602. For example, a series of images acquired by a camera 620(1) may indicate removal of an item 604 from a particular inventory location 614 by one of the users 616 and placement of the item 604 on or at least partially within one of the totes 618.

While the storage area 608 is depicted as having one or more aisles 612, inventory locations 614 storing the items 604, sensors 620, and so forth, it is understood that the receiving area 606, the transition area 610, or other areas of the facility 602 may be similarly equipped. Furthermore, the arrangement of the various areas within the facility 602 is depicted functionally rather than schematically. For example, multiple different receiving areas 606, storage areas 608, and transition areas 610 may be interspersed rather than segregated in the facility 602.

The facility 602 may include, or be coupled to, an inventory management system 622, which may perform some or all of the techniques described above with reference to FIGS. 1-7. For example, the inventory management system 622 may maintain a virtual cart of each user within the facility. The inventory management system 622 may also store a record associated with each user indicating the location of the user, and whether the user is eligible to exit the facility with one or more items without performing a manual checkout of the items. The inventory management system 622 may also generate and output notification data to the users, indicating whether or not they are so eligible.

As illustrated, the inventory management system 622 may reside at the facility 602 (e.g., as part of on-premises servers), on the servers 632 (which may represent, and/or include, the system(s) 114) that are remote from the facility 602, a combination thereof. In each instance, the inventory management system 622 is configured to identify interactions and events with and between users 616, devices such as sensors 620, robots, material handling equipment, computing devices, and so forth, in one or more of the receiving area 606, the storage area 608, or the transition area 610. As described above, some interactions may further indicate the existence of one or more events 624, or predefined activities of interest. For example, events 624 may include the entry of the user 616 to the facility 602, stocking of items 604 at an inventory location 614, picking of an item 604 from an inventory location 614, returning of an item 604 to an inventory location 614, placement of an item 604 within a tote 618, movement of users 616 relative to one another, gestures by the users 616, and so forth. Other events 624 involving users 616 may include the user 616 providing authentication information in the facility 602, using a computing device at the facility 602 to authenticate the user to the inventory management system 622, and so forth. Some events 624 may involve one or more other objects within the facility 602. For example, the event 624 may comprise movement within the facility 602 of an inventory location 614, such as a counter mounted on wheels. Events 624 may involve one or more of the sensors 620. For example, a change in operation of a sensor 620, such as a sensor failure, change in alignment, and so forth, may be designated as an event 624. Continuing the example, movement of a camera 620(1) resulting in a change in the orientation of the field of view 628 (such as resulting from someone or something bumping the camera 620(1)) may be designated as an event 624.

By determining the occurrence of one or more of the events 624, the inventory management system 622 may generate output data 626. The output data 626 comprises information about the event 624. For example, where the event 624 comprises an item 604 being removed from an inventory location 614, the output data 626 may comprise an item identifier indicative of the particular item 604 that was removed from the inventory location 614 and a user identifier of a user that removed the item.

The inventory management system 622 may use one or more automated systems to generate the output data 626. For example, an artificial neural network, one or more classifiers, or other automated machine learning techniques may be used to process the sensor data from the one or more sensors 620 to generate output data 626. For example, the inventory management system 622 may perform some or all of the techniques for generating and utilizing a classifier for identifying user activity in image data, as described in detail above. The automated systems may operate using probabilistic or non-probabilistic techniques. For example, the automated systems may use a Bayesian network. In another example, the automated systems may use support vector machines to generate the output data 626 or the tentative results. The automated systems may generate confidence level data that provides information indicative of the accuracy or confidence that the output data 626 or the tentative data corresponds to the physical world.

The confidence level data may be generated using a variety of techniques, based at least in part on the type of automated system in use. For example, a probabilistic system using a Bayesian network may use a probability assigned to the output as the confidence level. Continuing the example, the Bayesian network may indicate that the probability that the item depicted in the image data corresponds to an item previously stored in memory is 98%. This probability may be used as the confidence level for that item as depicted in the image data.

In another example, output from non-probabilistic techniques such as support vector machines may have confidence levels based on a distance in a mathematical space within which the image data of the item and the images of previously stored items have been classified. The greater the distance in this space from a reference point such as the previously stored image to the image data acquired during the occurrence, the lower the confidence level.

In yet another example, the image data of an object such as an item 604, user 616, and so forth, may be compared with a set of previously stored images. Differences between the image data and the previously stored images may be assessed. For example, differences in shape, color, relative proportions between features in the images, and so forth. The differences may be expressed in terms of distance with a mathematical space. For example, the color of the object as depicted in the image data and the color of the object as depicted in the previously stored images may be represented as coordinates within a color space.

The confidence level may be determined based at least in part on these differences. For example, the user 616 may pick an item 604(1) such as a perfume bottle that is generally cubical in shape from the inventory location 614. Other items 604 at nearby inventory locations 614 may be predominantly spherical. Based on the difference in shape (cube vs. sphere) from the adjacent items, and the correspondence in shape with the previously stored image of the perfume bottle item 604(1) (cubical and cubical), the confidence level that the user has picked up the perfume bottle item 604(1) is high.

In some situations, the automated techniques may be unable to generate output data 626 with a confidence level above a threshold result. For example, the automated techniques may be unable to distinguish which user 616 in a crowd of users 616 has picked up the item 604 from the inventory location 614. In other situations, it may be desirable to provide human confirmation of the event 624 or of the accuracy of the output data 626. For example, some items 604 may be deemed age restricted such that they are to be handled only by users 616 above a minimum age threshold.

In instances where human confirmation is desired, sensor data associated with an event 624 may be processed to generate inquiry data. The inquiry data may include a subset of the sensor data associated with the event 624. The inquiry data may also include one or more of one or more tentative results as determined by the automated techniques, or supplemental data. The subset of the sensor data may be determined using information about the one or more sensors 620. For example, camera data such as the location of the camera 620(1) within the facility 602, the orientation of the camera 620(1), and a field of view 628 of the camera 620(1) may be used to determine if a particular location within the facility 602 is within the field of view 628. The subset of the sensor data may include images that may show the inventory location 614 or that the item 604 was stowed. The subset of the sensor data may also omit images from other cameras 620(1) that did not have that inventory location 614 in the field of view 628. The field of view 628 may comprise a portion of the scene in the facility 602 that the sensor 620 is able to generate sensor data about.

Continuing the example, the subset of the sensor data may comprise a video clip acquired by one or more cameras 620(1) having a field of view 628 that includes the item 604. The tentative results may comprise the "best guess" as to which items 604 may have been involved in the event 624. For example, the tentative results may comprise results determined by the automated system that have a confidence level above a minimum threshold.

The facility 602 may be configured to receive different kinds of items 604 from various suppliers and to store them until a customer orders or retrieves one or more of the items 604. A general flow of items 604 through the facility 602 is indicated by the arrows of FIG. 6. Specifically, as illustrated in this example, items 604 may be received from one or more suppliers, such as manufacturers, distributors, wholesalers, and so forth, at the receiving area 606. In various implementations, the items 604 may include merchandise, commodities, perishables, or any suitable type of item 604, depending on the nature of the enterprise that operates the facility 602. The receiving of the items 604 may comprise one or more events 624 for which the inventory management system 622 may generate output data 626.

Upon being received from a supplier at receiving area 606, the items 604 may be prepared for storage. For example, items 604 may be unpacked or otherwise rearranged. The inventory management system 622 may include one or more software applications executing on a computer system to provide inventory management functions based on the events 624 associated with the unpacking or rearrangement. These inventory management functions may include maintaining information indicative of the type, quantity, condition, cost, location, weight, or any other suitable parameters with respect to the items 604. The items 604 may be stocked, managed, or dispensed in terms of countable, individual units or multiples, such as packages, cartons, crates, pallets, or other suitable aggregations. Alternatively, some items 604, such as bulk products, commodities, and so forth, may be stored in continuous or arbitrarily divisible amounts that may not be inherently organized into countable units. Such items 604 may be managed in terms of measurable quantity such as units of length, area, volume, weight, time, duration, or other dimensional properties characterized by units of measurement. Generally speaking, a quantity of an item 604 may refer to either a countable number of individual or aggregate units of an item 604 or a measurable amount of an item 604, as appropriate.

After arriving through the receiving area 606, items 604 may be stored within the storage area 608. In some implementations, like items 604 may be stored or displayed together in the inventory locations 614 such as in bins, on shelves, hanging from pegboards, and so forth. In this implementation, all items 604 of a given kind are stored in one inventory location 614. In other implementations, like items 604 may be stored in different inventory locations 614. For example, to optimize retrieval of certain items 604 having frequent turnover within a large physical facility 602, those items 604 may be stored in several different inventory locations 614 to reduce congestion that might occur at a single inventory location 614. Storage of the items 604 and their respective inventory locations 614 may comprise one or more events 624.

When a customer order specifying one or more items 604 is received, or as a user 616 progresses through the facility 602, the corresponding items 604 may be selected or "picked" from the inventory locations 614 containing those items 604. In various implementations, item picking may range from manual to completely automated picking. For example, in one implementation, a user 616 may have a list of items 604 they desire and may progress through the facility 602 picking items 604 from inventory locations 614 within the storage area 608, and placing those items 604 into a tote 618. In other implementations, employees of the facility 602 may pick items 604 using written or electronic pick lists derived from customer orders. These picked items 604 may be placed into the tote 618 as the employee progresses through the facility 602. Picking may comprise one or more events 624, such as the user 616 in moving to the inventory location 614, retrieval of the item 604 from the inventory location 614, and so forth.

After items 604 have been picked, they may be processed at a transition area 610. The transition area 610 may be any designated area within the facility 602 where items 604 are transitioned from one location to another or from one entity to another. For example, the transition area 610 may be a packing station within the facility 602. When the item 604 arrives at the transition area 610, the items 604 may be transitioned from the storage area 608 to the packing station. The transitioning may comprise one or more events 624. Information about the transition may be maintained by the inventory management system 622 using the output data 626 associated with those events 624.

In another example, if the items 604 are departing the facility 602 a list of the items 604 may be obtained and used by the inventory management system 622 to transition responsibility for, or custody of, the items 604 from the facility 602 to another entity. For example, a carrier may accept the items 604 for transport with that carrier accepting responsibility for the items 604 indicated in the list. In another example, a customer may purchase or rent the items 604 and remove the items 604 from the facility 602. The purchase or rental may comprise one or more events 624.

The inventory management system 622 may access or generate sensor data about the facility 602 and the contents therein including the items 604, the users 616, the totes 618, and so forth. The sensor data may be acquired by one or more of the sensors 620, data provided by other systems, and so forth. For example, the sensors 620 may include cameras 620(1) configured to acquire image data of scenes in the facility 602. The image data may comprise still images, video, or a combination thereof. The image data may be processed by the inventory management system 622 to determine a location of the user 616, the tote 618, the identifier of the user 616, and so forth. As used herein, the identity of the user may represent a unique identifier of the user (e.g., name, number associated with user, username, etc.), an identifier that distinguishes the user amongst other users being located within the environment, or the like.

The inventory management system 622, or systems coupled thereto, may be configured to associate an account with the user 616, as well as to determine other candidate users. An account of the user 616 may be determined before, during, or after entry to the facility 602.

In some instances, the inventory management system 622 groups users within the facility into respective sessions. That is, the inventory management system 622 may utilize the sensor data to determine groups of users that are effectively "together" (e.g., shopping together). In some instances, a particular session may include multiple users that entered the facility 602 together and, potentially, that navigate the facility together. For example, when a family of two adults and two children enter the facility together, the inventory management system may associate each user with a particular session. Locating groups in addition to individual users may help in determining the outcome of individual events, given that users within a session may not only individually order, pick, return, or otherwise interact with items, but may also pass the items back and forth amongst each other. For instance, a child in the above example may pick the box of cereal before handing the box to her mother, who may place it in her tote 618. Noting the child and the mother as belonging to the same session may increase the chances of successfully adding the box of cereal to the virtual shopping cart of the mother.

By determining the occurrence of one or more events 624 and the output data 626 associated therewith, the inventory management system 622 is able to provide one or more services to the users 616 of the facility 602. By utilizing one or more facility associates to process inquiry data and generate response data that may then be used to produce output data 626, overall accuracy of the system may be enhanced. The enhanced accuracy may improve the user experience of the one or more users 616 of the facility 602. In some examples, the output data 626 may be transmitted over a network 630 to one or more servers 632 (e.g., remote system(s)).

FIG. 7 illustrates a block diagram of the server(s) 632. The server(s) 632 may be physically present at the facility 602, may be accessible by the network 630, or a combination of both. The server(s) 632 do not require end-user knowledge of the physical location and configuration of the system that delivers the services. Common expressions associated with the server(s) 632 may include "on-demand computing," "software as a service (SaaS)," "cloud services," "data centers," "remote system(s)", and so forth. Services provided by the server(s) 632 may be distributed across one or more physical or virtual devices.

The server(s) 632 may include one or more hardware processors 702 (processors) configured to execute one or more stored instructions. The processor(s) 702 may comprise one or more cores. The server(s) 632 may include one or more input/output (I/O) interfaces 704 to allow the processor 702 or other portions of the server(s) 632 to communicate with other devices. The I/O interface(s) 704 may comprise Inter-Integrated Circuit (I2C), Serial Peripheral Interface bus (SPI), Universal Serial Bus (USB) as promulgated by the USB Implementers Forum, and so forth.

The server(s) 632 may also include one or more communication interfaces 708. The communication interface(s) 708 are configured to provide communications between the server(s) 632 and other devices, such as the sensors 620, the interface devices, routers, and so forth. The communication interface(s) 708 may include devices configured to couple to personal area networks (PANs), wired and wireless local area networks (LANs), wired and wireless wide area networks (WANs), and so forth. For example, the communication interface(s) 708 may include devices compatible with Ethernet, Wi-Fi™, and so forth. The server(s) 632 may also include one or more busses or other internal communications hardware or software that allow for the transfer of data between the various modules and components of the servers 632.

The server(s) 632 may also include a power supply 740. The power supply 740 is configured to provide electrical power suitable for operating the components in the server(s) 632.

The server(s) 632 may further include one or more memories 710. The memory 710 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 710 provides storage of computer-readable instructions, data structures, program modules, and other data for the operation of the servers 632. A few example functional modules are shown stored in the memory 710, although the same functionality may alternatively be implemented in hardware, firmware, or as a system on a chip (SOC).

The memory 710 may include at least one operating system (OS) component 712. The OS component 712 is configured to manage hardware resource devices such as the I/O interface(s) 704, the communication interface(s) 708, and provide various services to applications or components executing on the processor(s) 702. The OS component 712 may implement a variant of the FreeBSD™ operating system as promulgated by the FreeBSD Project; other UNIX™ or UNIX-like variants; a variation of the Linux™ operating system as promulgated by Linus Torvalds; the Windows® Server operating system from Microsoft Corporation of Redmond, Washington, USA; and so forth.

One or more of the following components may also be stored in the memory 710. These components may be executed as foreground applications, background tasks, daemons, and so forth. A communication component(s) 714 may be configured to establish communications with one or more of the sensors 620, one or more of the devices used by associates, other server(s) 632, or other devices. The communications may be authenticated, encrypted, and so forth.

The memory 710 may store an inventory management system 716. The inventory management system 716 is configured to provide the inventory functions as described herein with regard to the inventory management system 622. For example, the inventory management system 716 may track movement of items 604 in the facility 602, generate user interface data, and so forth.

The inventory management system 716 may access information stored in one or more data stores 718 in the memory 710. The data store(s) 718 may use a flat file, database, linked list, tree, executable code, script, or other data structure to store the information. In some implementations, the data store(s) 718 or a portion of the data store(s) 718 may be distributed across one or more other devices including other servers 632, network attached storage devices, and so forth.

The data store(s) 718 may include physical layout data 720. The physical layout data 720 provides a mapping of physical locations within the physical layout of devices and objects such as the sensors 620, inventory locations 614, and so forth. The physical layout data 720 may indicate the coordinates within the facility 602 of an inventory location 614, sensors 620 within view of that inventory location 614, and so forth. For example, the physical layout data 720 may include camera data comprising one or more of a location within the facility 602 of a camera 620(1), orientation of the camera 620(1), the operational status, and so forth. Continuing example, the physical layout data 720 may indicate the coordinates of the camera 620(1), pan and tilt information indicative of a direction that the field of view 628 is oriented along, whether the camera 620(1) is operating or malfunctioning, and so forth.

In some implementations, the inventory management system 716 may access the physical layout data 720 to determine if a location associated with the event 624 is within the field of view 628 of one or more sensors 620. Continuing the example above, given the location within the facility 602 of the event 624 and the camera data, the inventory management system 716 may determine the cameras 620(1) that may have generated images of the event 624.

The item data 722 comprises information associated with the items 604. The information may include information indicative of one or more inventory locations 614 at which one or more of the items 604 are stored. The item data 722 may also include order data, SKU or other product identifier, price, quantity on hand, weight, expiration date, images of the item 604, detail description information, ratings, ranking, and so forth. The inventory management system 716 may store information associated with inventory management functions in the item data 722.

The data store(s) 718 may also include sensor data 724. The sensor data 724 comprises information acquired from, or based on, the one or more sensors 620. For example, the sensor data 724 may comprise 3D information about an object in the facility 602. As described above, the sensors 620 may include a camera 620(1), which is configured to acquire one or more images. These images may be stored as the image data 726. The image data 726 may comprise information descriptive of a plurality of picture elements or pixels. Non-image data 728 may comprise information from other sensors 620, such as input from microphones, weight sensors, and so forth.

User data 730 may also be stored in the data store(s) 718. The user data 730 may include identity data, information indicative of a profile, purchase history, location data, and so forth. Individual users 616 or groups of users 616 may selectively provide user data 730 for use by the inventory management system 622. The individual users 616 or groups of users 616 may also authorize collection of the user data 730 during use of the facility 602 or access to user data 730 obtained from other systems. For example, the user 616 may opt-in to collection of the user data 730 to receive enhanced services while using the facility 602.

In some implementations, the user data 730 may include information designating a user 616 for special handling. For example, the user data 730 may indicate that a particular user 616 has been associated with an increased number of errors with respect to output data 626. The inventory management system 716 may be configured to use this information to apply additional scrutiny to the events 624 associated with this user 616. For example, events 624 that include an item 604 having a cost or result above the threshold amount may be provided to a facility associate for processing regardless of the determined level of confidence in the output data 626 as generated by the automated system.

The inventory management system 716 may include one or more of a location component 732, identification component 734, servers 212736, and inquiry component 738, potentially amongst other components 756.

The location component 732 functions to locate items or users within the environment of the facility to allow the inventory management system 716 to assign certain events to the correct users. That is, the location component 732 may assign unique identifiers to users as they enter the facility and, with the users' consent, may locate the users throughout the facility 602 over the time they remain in the facility 602. The location component 732 may perform this locating using sensor data 724, such as the image data 726. For example, the location component 732 may receive the image data 726 and may use techniques to identify users from the images. After identifying a particular user within the facility, the location component 732 may then locate the user within the images as the user moves throughout the facility 602. Further, should the location component 732 temporarily "lose" a particular user, the location component 732 may again attempt to identify the users within the facility based on techniques.

Therefore, upon receiving the indication of the time and location of the event in question, the location component 732 may query the data store 718 to determine which one or more users were at or within a threshold distance of the location of the event at the particular time of the event. Further, the location component 732 may assign different confidence levels to different users, with the confidence levels indicating how likely it is that each corresponding user is the user that is in fact associated with the event of interest.

The location component 732 may access the sensor data 724 in order to determine this location data of the user and/or items. The location data provides information indicative of a location of an object, such as the item 604, the user 616, the tote 618, and so forth. The location may be absolute with respect to the facility 602 or relative to another object or point of reference. Absolute terms may comprise a latitude, longitude, and altitude with respect to a geodetic reference point. Relative terms may include a location of 25.4 meters (m) along an x-axis and 75.2 m along a y-axis as designated by a floor plan of the facility 602, 5.2 m from an inventory location 614 along a heading of 169°, and so forth. For example, the location data may indicate that the user 616(1) is 25.2 m along the aisle 612(1) and standing in front of the inventory location 614. In comparison, a relative location may indicate that the user 616(1) is 32 cm from the tote 618 at a heading of 730 with respect to the tote 618. The location data may include orientation information, such as which direction the user 616 is facing. The orientation may be determined by the relative direction the user's 616 body is facing. In some implementations, the orientation may be relative to the interface device. Continuing the example, the location data may indicate that the user 616(1) is oriented with a heading of 0°, or looking north. In another example, the location data may indicate that the user 616 is facing towards the interface device.

The identification component 734 is configured to identify an object. In one implementation, the identification component 734 may be configured to identify an item 604. In another implementation, the identification component 734 may be configured to identify the user 616. For example, the identification component 734 may use facial recognition techniques to process the image data 726 and determine the user 616 depicted in the images by comparing the characteristics in the image data 726 with previously stored results. The identification component 734 may also access data from other sensors 620, such as from an RFID reader, an RF receiver, and so forth.

The servers 212736 is configured to process the sensor data 724 and generate output data 626, and may include components described above. The servers 212736 may access information stored in the data store(s) 718 including, but not limited to, event-description data 742, confidence levels 744, or threshold values 746. In some instances, the servers 212736 may be configured to perform some or all of the techniques described above with regards to the servers 212736. For instance, the servers 212736 may be configured to create and utilize event classifiers for identifying events (e.g., predefined activity) within image data, potentially without use of other sensor data acquired by other sensors in the environment.

The event-description data 742 comprises information indicative of one or more events 624. For example, the event-description data 742 may comprise predefined profiles that designate movement of an item 604 from an inventory location 614 with the event 624 of "pick". The event-description data 742 may be manually generated or automatically generated. The event-description data 742 may include data indicative of triggers associated with events occurring in the facility 602. An event may be determined as occurring upon detection of the trigger. For example, sensor data 724 such as a change in weight from a weight sensor 620 at an inventory location 614 may trigger detection of an event of an item 604 being added or removed from the inventory location 614. In another example, the trigger may comprise an image of the user 616 reaching a hand toward the inventory location 614. In yet another example, the trigger may comprise two or more users 616 approaching to within a threshold distance of one another.

The servers 212736 may process the sensor data 724 using one or more techniques including, but not limited to, artificial neural networks, classifiers, decision trees, support vector machines, Bayesian networks, and so forth. For example, the servers 212736 may use a decision tree to determine occurrence of the "pick" event 624 based on sensor data 724. The servers 212736 may further use the sensor data 724 to determine one or more tentative results 748. The one or more tentative results 748 comprise data associated with the event 624. For example, where the event 624 comprises a disambiguation of users 616, the tentative results 748 may comprise a list of possible user 616 identities. In another example, where the event 624 comprises a disambiguation between items, the tentative results 748 may comprise a list of possible item identifiers. In some implementations, the tentative result 748 may indicate the possible action. For example, the action may comprise the user

616 picking, placing, moving an item 604, damaging an item 604, providing gestural input, and so forth.

In some implementations, the tentative results 748 may be generated by other components. For example, the tentative results 748 such as one or more possible identities or locations of the user 616 involved in the event 624 may be generated by the location component 732. In another example, the tentative results 748 such as possible items 604 that may have been involved in the event 624 may be generated by the identification component 734.

The servers 212736 may be configured to provide a confidence level 744 associated with the determination of the tentative results 748. The confidence level 744 provides indicia as to the expected level of accuracy of the tentative result 748. For example, a low confidence level 744 may indicate that the tentative result 748 has a low probability of corresponding to the actual circumstances of the event 624. In comparison, a high confidence level 744 may indicate that the tentative result 748 has a high probability of corresponding to the actual circumstances of the event 624.

In some implementations, the tentative results 748 having confidence levels 744 that exceed the threshold may be deemed to be sufficiently accurate and thus may be used as the output data 626. For example, the servers 212736 may provide tentative results 748 indicative of the three possible items 604(1), 604(2), and 604(3) corresponding to the "pick" event 624. The confidence levels 744 associated with the possible items 604(1), 604(2), and 604(3) may be 25%, 70%, 92%, respectively. Continuing the example, the threshold value 746 may be set such that confidence level 744 of 70% are deemed to be sufficiently accurate. As a result, the servers 212736 may designate the "pick" event 624 as involving item 604(3).

The inquiry component 738 may be configured to use at least a portion of the sensor data 724 associated with the event 624 to generate inquiry data 750. In some implementations, the inquiry data 750 may include one or more of the tentative results 748 or supplemental data 752. The inquiry component 738 may be configured to provide inquiry data 750 to one or more devices associated with one or more human associates.

An associate user interface is presented on the respective devices of associates. The associate may generate response data 754 by selecting a particular tentative result 748, entering new information, indicating that they are unable to answer the inquiry, and so forth.

The supplemental data 752 comprises information associated with the event 624 or that may be useful in interpreting the sensor data 724. For example, the supplemental data 752 may comprise previously stored images of the items 604. In another example, the supplemental data 752 may comprise one or more graphical overlays. For example, the graphical overlays may comprise graphical user interface elements such as overlays depicting indicia of an object of interest. These indicia may comprise highlights, bounding boxes, arrows, and so forth, that have been superimposed or placed atop the image data 726 during presentation to an associate.

The inquiry component 738 processes the response data 754 provided by the one or more associates. The processing may include calculating one or more statistical results associated with the response data 754. For example, statistical results may include a count of the number of times associates selected a particular tentative result 748, determination of a percentage of the associates that selected a particular tentative result 748, and so forth.

The inquiry component 738 is configured to generate the output data 626 based at least in part on the response data 754. For example, given that a majority of the associates returned response data 754 indicating that the item 604 associated with the "pick" event 624 is item 604(5), the output data 626 may indicate that the item 604(5) was picked.

The inquiry component 738 may be configured to selectively distribute inquiries to particular associates. For example, some associates may be better suited to answering particular types of inquiries. Performance data, such as statistical data about the performance of the associates, may be determined by the inquiry component 738 from the response data 754 provided by the associates. For example, information indicative of a percentage of different inquiries in which the particular associate selected response data 754 that disagreed with the majority of associates may be maintained. In some implementations, test or practice inquiry data 750 having a previously known correct answer may be provided to the associate for training or quality assurance purposes. The determination of the set of associates to use may be based at least in part on the performance data.

By using the inquiry component 738, the servers 212736 may be able to provide high reliability output data 626 that accurately represents the event 624. The output data 626 generated by the inquiry component 738 from the response data 754 may also be used to further train the automated systems used by the inventory management system 716. For example, the sensor data 724 and the output data 626, based on response data 754, may be provided to one or more of the components of the inventory management system 716 for training in process improvement. Continuing the example, this information may be provided to an artificial neural network, Bayesian network, and so forth, to further train these systems such that the confidence level 744 and the tentative results 748 produced in the future for the same or similar input is improved. Finally, as FIG. 7 illustrates, the server(s) 632 may store and/or utilize other data 758.

As further shown in the example of FIG. 7, the inventory management system 716 may include a determination component 760. As described herein, the inventory management system 716 may use the determination component 760 in order to identify interactions and/or events associated with the facility 602. To identify the interactions and/or events, the determination component 760 may generate and/or processes at least feature data 762, heatmap data 764, input data 766, inventory data 768, and/or any other type of data.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

What is claimed is:

1. A method comprising:

receiving first sensor data from a first sensor within a facility, wherein the first sensor includes an image sensor that is positioned and arranged within the facility in association with an inventory location and the first sensor data includes image data of first representations of the inventory location;

determining, based at least in part on the first sensor data, a first event associated with a first interaction with an item at the inventory location and at a first time;

receiving second sensor data from a second sensor within the facility, wherein the second sensor includes a load sensor that is positioned and arranged within the facility in association with the inventory location and the second sensor data includes second representations of the inventory location;

determining, based at least in part on the second sensor data, a second event and a second time associated with the second event;

determining, based at least in part on the first time and the second time, that the first event coincides with the second event;

calibrating, in response to the first event coinciding with the second event, the second sensor within the facility, wherein calibrating the second sensor includes processing the image data and the second sensor data to identify a position of the second sensor based on a relative location of the second sensor from the image data; and storing an association between the position of the second sensor and the inventory location.

2. The method as recited in claim 1, wherein:

the first interaction comprises removal of the item at the inventory location;

the second event comprises a removal of a weight from a structure coupled to the second sensor; and determining that the first event coincides with the second event comprises determining that the removal of the item corresponds to the removal of the weight.

3. The method as recited in claim 1, wherein determining that the first event coincides with the second event is based at least in part on the first time being within a threshold period of time of the second time.

4. The method as recited in claim 1, wherein determining that the first event coincides with the second event is based at least in part on a first duration of the first event and a second duration of the second event, the second duration being within a threshold amount of the first duration.

5. The method as recited in claim 1, wherein the position of the second sensor further comprises a pose of the second sensor within the facility.

6. The method as recited in claim 1, wherein:

the first interaction comprises a user picking, scanning, and returning the item;

the second event comprises an item being removed and replaced on a structure coupled to the second sensor; and determining the first event coincides with the second event comprises determining that the item being removed and replaced on the structure coincides with the first interaction.

7. The method as recited in claim 1, wherein the first sensor data comprises image data and the second sensor data comprises weight data, the method further comprising:

determining, based at least in part on second image data at a third time later than the first time and from a camera within the facility, a third event associated with a second interaction with a second item at the inventory location; and determining a second location associated with the third event based at least in part on the second image data;

determining, based at least in part on second weight data, a fourth event; and refining, based at least in part on the third event and the fourth event, the position of the second sensor within the facility.

8. The method as recited in claim 1, wherein:

calibrating the second sensor further comprises determining a product volume defining a space for the item at the inventory location based at least in part on the first sensor data; and storing the association between the position and the inventory location comprises an association between the product volume and the position.

9. The method as recited in claim 8, further comprising receiving a product identifier associated with the item, and wherein storing the association comprises storing an association between the product volume and the product identifier.

10. The method as recited in claim 9, further comprising identifying one or more items removed from the product volume based on the second sensor data, the second sensor data comprising weight data, and the association between the product volume and the product identifier.

28

11. A system comprising:

one or more processors; and one or more computer-readable media storing instructions that, when executed by the one or more processors, cause the one or more processors to perform operations comprising:

receiving first sensor data from a first sensor within a facility, wherein the first sensor includes an image sensor that is positioned and arranged within the facility in association with an inventory location and the first sensor data includes image data of first representations of the inventory location;

determining, based at least in part on the first sensor data, a first event associated with a first interaction with an item at the inventory location and at a first time;

receiving second sensor data from a second sensor within the facility, wherein the second sensor includes a load sensor that is positioned and arranged within the facility in association with the inventory location and the second sensor data includes weight data of second representations of the inventory location;

determining, based at least in part on the second sensor data, a second event and a second time associated with the second event;

determining, based at least in part on the first time and the second time, that the first event coincides with the second event;

calibrating, in response to the first event coinciding with the second event, a position of the second sensor within the facility, wherein calibrating the second sensor includes processing the image data and the second sensor data to identify a position of the second sensor based on a relative location of the second sensor from the image data; and storing an association between the position of the second sensor and the inventory location.

12. The system as recited in claim 11, wherein:

the first interaction comprises removal of the item at the inventory location;

the second event comprises a removal of a weight from a structure coupled to the second sensor; and determining that the first event coincides with the second event comprises determining that the removal of the item corresponds to the removal of the weight.

13. The system as recited in claim 11, wherein determining that the first event coincides with the second event is based at least in part on the first time being within a threshold period of time of the second time.

14. The system as recited in claim 11, wherein determining that the first event coincides with the second event is based at least in part on a first duration of the first event and a second duration of the second event, the second duration being within a threshold amount of the first duration.

15. The system as recited in claim 11, wherein:

the first interaction comprises a user picking, scanning, and returning the item;

the second event comprises an item being removed and replaced on a structure coupled to the second sensor; and determining the first event coincides with the second event comprises determining that the item being removed and replaced on the structure coincides with the first interaction.

16. The system as recited in claim 11, the operations further comprising:

determining, based at least in part on second image data at a third time later than the first time and from a camera within the facility, a third event associated with a second interaction with a second item at the inventory location;

determining a second location associated with the third event based at least in part on the second image data;

determining, based at least in part on second weight, a fourth event; and refining, based at least in part on the third event and the fourth event, the position of the second sensor within the facility.

17. The system as recited in claim 11, further comprising receiving a product identifier associated with the item, and wherein:

calibrating the second sensor further comprises determining a product volume defining a space for the item at the inventory location; and storing the association between the position and the inventory location comprises an association between the product volume, the product identifier and the position of the weight sensor.

18. A system, comprising:

a plurality of sensors arranged and positioned within a facility in association with a plurality of inventory locations; and a management system including one or more processors and a memory storing program instructions thereon that, when executed by the one or more processors, cause the one or more processors to at least:

receive, from a first sensor of the plurality of sensors, first sensor data associated with a first event at a first inventory location, wherein:

the first sensor is positioned and arranged within the facility in association with the first inventory location of the plurality of inventory locations;

the first sensor includes an image sensor; and the first sensor data includes representations of the first inventory location and a first timestamp associated with the first event;

receive, from a second sensor of the plurality of sensors, second sensor data associated with a second event at the first inventory location, wherein:

the second sensor is positioned and arranged within the facility in association with the first inventory location;

the second sensor includes a weight sensor; and the second sensor data includes representations of the first inventory location and a second timestamp associated with the second event;

determine, based at least in part on the first timestamp and the second timestamp, that the first event and the second event coincide; and in response to the determination that the first event and the second event coincide, calibrate the second sensor, wherein calibrating the second sensor includes processing the first sensor data and the second sensor data to identify a position of the second sensor within the facility based on a relative location of the second sensor from the image data.

19. The system of claim 18, wherein:

the program instructions, when executed by the one or more processors, cause the one or more processors to at least determine, at least in part on the first sensor data, a product volume associated with the first inventory location;

the product volume defines a space where one or more products are placed at the first inventory location; and the position of the second sensor is further determined based at least in part on the product volume.

20. The system of claim 18, wherein the position of the second sensor includes a pose of the second sensor.

* * * * *